United States Patent [19]

Helfgott et al.

[11] Patent Number: 4,844,813

[45] Date of Patent: Jul. 4, 1989

[54] SYSTEM AND PROCESS FOR TREATMENT OF BIODEGRADABLE WASTE

[75] Inventors: Theodore Helfgott, Highland Park, N.J.; Michael R. Corn, Brentwood, Tenn.

[73] Assignee: Amerada Hess Corporation, New York, N.Y.

[21] Appl. No.: 68,926

[22] Filed: Jun. 29, 1987

[51] Int. Cl.$^4$ .............................................. C02F 1/00
[52] U.S. Cl. ................... 210/747; 210/170; 405/129; 405/270
[58] Field of Search ................ 405/52, 53, 128, 129, 405/263, 270; 210/170, 747

[56] References Cited

U.S. PATENT DOCUMENTS

| | | | |
|---|---|---|---|
| 3,841,102 | 10/1974 | Cinner et al. ....................... | 405/128 |
| 4,252,462 | 2/1981 | Klingle et al. ...................... | 405/129 |
| 4,448,690 | 5/1984 | Maphis ............................ | 405/128 X |
| 4,624,604 | 11/1986 | Wagner et al. .................... | 405/128 |
| 4,696,599 | 9/1987 | Rakoczynski et al. ............. | 405/129 |

OTHER PUBLICATIONS

"Landfarming Shows Promise For Refinery Waste Disposal", Oil and Gas Journal, May 14, 1979, pp. 108-116.

Primary Examiner—David H. Corbin
Attorney, Agent, or Firm—George W. MacDonald, Jr.

[57] ABSTRACT

A system and method for treating biodegradable waste which includes a land treatment area surrounded by dikes and underlain by an impermeable layer. A leachate collection system, with a pre-determined slope and an underdrain system, overlies the impermeable layer. The leachate collection system permits the collection of effluent which is routed to a wastewater treatment system. Surface water is removed by an exterior drainage system.

35 Claims, 3 Drawing Sheets

SYSTEM AND PROCESS FOR TREATMENT OF BIODEGRADABLE WASTE

BACKGROUND OF THE INVENTION

1. Field of the Invention

This relates to a new and useful method and system, known as a "landfarm," for the treatment of biodegradable organic materials in a contained soily area to produce stable non-pollutional end-products, to hold refractory residual materials, and to permit the rapid, controlled, removal of water that is diminished in pollutional content.

2. Description of the Related Art

It has been known for some time that certain types of biodegradable wastes, such as petroleum residuals, organic debris from municipalities, and certain chemical organic e.g., pharmaceutical, wastes, may be treated and detoxified more or less passively by spreading them upon a selected site and subjecting them to certain techniques designed to maximize and accelerate the process of biodegradation. Such "landfarms" are to be distinguished from other methods of waste treatment, for example, "landfills," which, in the environmentally most satisfactory form, involve the deposition of various forms of waste on a selected site, attempting to contain the often-toxic degradation products thereof, and covering the waste with a layer of soil. Another well-known method of attempting to dispose of waste is by incineration.

Such other methods of waste disposal have many and well-known disadvantages in themselves and, in particular, are not well-adapted to the detoxification of biodegradable chemical wastes. Incineration, for example, has been found to require an excess input of additional energy in order to sustain the burning process and an undue percentage of the combustion residue, including some of the most toxic elements, enters the atmosphere and is spread over the countryside. Landfills, on the other hand, are ill-adapted to treat many of such biodegradable waste products, for example, petroleum wastes, because the latter wastes are relatively inert in a landfill environment and do not substantially decompose in the anaerobic conditions existing inside a landfill. Furthermore, when such biodegradable waste is mixed with the other components of a landfill, such as garbage, the result may be an increased leaching, due to anaerobic or reducing conditions, of the toxic elements, such as heavy metals, from the biodegradable waste into the groundwater.

The particular advantages of landfarming with respect to biodegradable wastes are well-known; for example, landfarms are energy-conserving, in that they merely require the spreading and ploughing, at varying intervals, of the waste on the site without the addition of intensive energy, to, for example, burn the wastes. Also, landfarms do not require the addition of layers of soil, known as "clean fill", as in landfills, nor are they subject to the spontaneous combustion, methane explosions, and/or noxious smells such as from hydrogen sulfide generation which are often associated with landfills. Perhaps most importantly, the end products of the landfarming process, carbon dioxide, water, and increased stable humus content (largely bacterial cells), are, unlike certain of the end products of other waste disposal processes, benign.

Although existing landfarms are generally more effective in treating biodegradable waste than other waste disposal methods, in certain areas, where soils are primarily sandy with high water tables (water near the surface), existing landfarm methods and systems can result in the loss of waste constituents to groundwater systems before such constituents are degraded or sufficiently attenuated to substantially eliminate contamination. Such currently existing landfarm technology is generally described in the article "Landfarming Shows Promise for Refinery Waste Disposal," *Oil and Gas Journal;* May 14, 1979; pp. 108–116. Methods for controlling contamination in runoff from waste disposal facilities have been principally described in connection with landfills, for example, those shown in U.S. Pat.: Nos. 4,399,039 (use of an additive, plus added sand); 4,395,338 (dewatering); 4,336,978 (use of a liner); 3,841,102 (entrapment of pollutants through solidification); 3,732,967 (pumping out contaminated liquid); 4,252,462 (dewatering of sludge provided by a system which involves compressing an impervious base, surmounted by a liquid pervious material containing a liquid collection system). As may be seen therein, such methods are principally concerned with containment or dewatering, rather than with the return of detoxified waters to the environment.

SUMMARY OF THE INVENTION

The present invention concerns a landfarm suitable for use in areas of highly permeable soils, such as sands, with high water table levels or in areas which may have an underlying critical groundwater supply or aquifer. It is also appropriate for areas with high water tables in which water does not drain rapidly. Rapidly permeable soils tend to permit the relatively rapid passage of water through them into the groundwater. Because of the speed of percolation, the water that thus passes through the sandy soils is likely to retain a harmful level of polluting and/or toxic materials. Where an important underlying groundwater supply, such as an aquifer, is present, the problem of leaching of polluting or toxic materials is especially critical.

The present invention, therefore, maximizes the known advantages of landfarms in treating biodegradable wastes and provides a solution to the problem of leaching into groundwater of contaminated effluent in sandy soils or in soils overlying a critical groundwater supply. To accomplish this, the present invention provides a comprehensive system and method which includes a land treatment area, surrounded by dikes and underlain by an impermeable layer (e.g. a clay or membrane liner). A leachate collection system, consisting of a sandy layer, with a pre-determined slope and an underdrain system, overlies the impermeable layer. The leachate collection system permits the collection of effluent, which is routed to a wastewater treatment system. Surface water is removed by means of an exterior drainage system to a solids and oil removal and/or treatment system. The present invention thus provides an exterior and interior surface water drainage system, whereby run-on and run-off, as well as leachate, is controlled and whereby the disposition of all waters in the system is controlled and such waters may be sent for further treatment as necessary. The present invention further provides selected treatment zone media whereby the optimum combination and proportions of soil, clay, loam and sand are available to permit the degradation of waste constituents by soil bacteria and to immobilize non-degradable constituents, while allowing controlled drainage of water. An important further advantage of the present invention is that by providing a means to draw off water effectively and relatively quickly, a deeper aerobic zone is permitted, in which more rapid degradation of waste constituents by indigenous bacteria can take place. Yet another important advantage of the present invention is that it permits a higher loading rate for waste materials because the present system, due to water control mechanisms built into the landfarm, is not as limited by the area available for surface loading as previously known systems and because the present invention provides greater assurance that pollutants or untreated or incompletely treated waste constituents passing through the treatment zone will be captured for further treatment because of the optimum combination of soils. The present invention thus provides both greater efficiency and security in the treatment of wastes. The result is that the amount of waste material that can be processed in a given period is increased as compared to conventional land treatment units. The present system may also be used in connection with more types of soils than previous systems. Because the soil composition of the present landfarm is optimized and superior provision is made to remove excess water, the present system allows the soil bacteria to remain active for longer periods than do prior systems. The superior water removal capability also results in greater availability of the disposal site, i.e., waste loading may take place on more days of the year than heretofore. The present invention offers the greatest potential benefit where land space is limited and where there are highly permeable soils; that is, in areas in which there is the greatest potential for groundwater contamination.

The structure and operation of the present invention, as well as further advantages, will be apparent from the following detailed description as well as the drawings.

DESCRIPTION OF THE PREFERRED EMBODIMENTS

Figure 1:
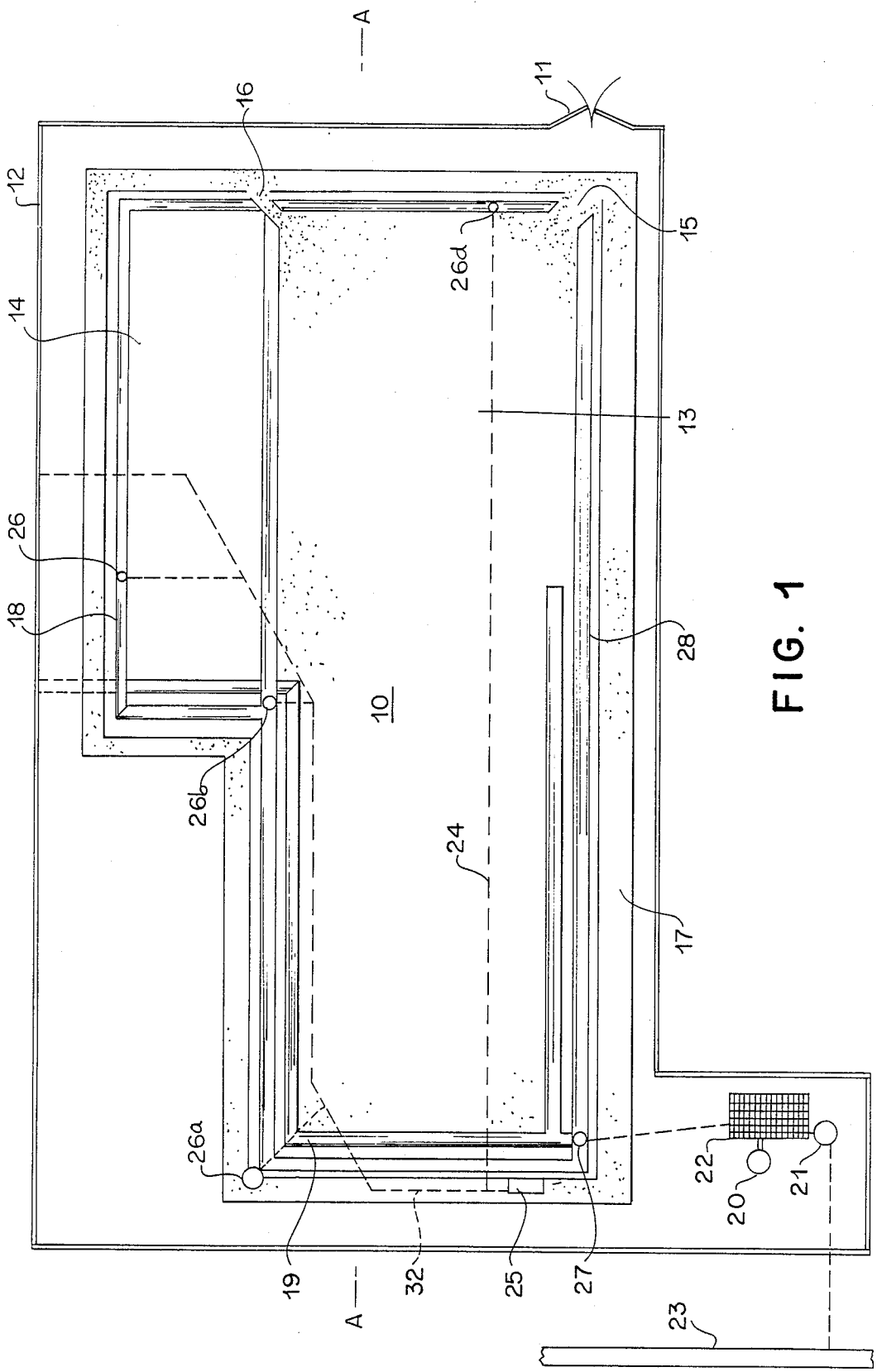
FIG. 1 is a plan view of the landfarm of the present invention.
Figure 2:
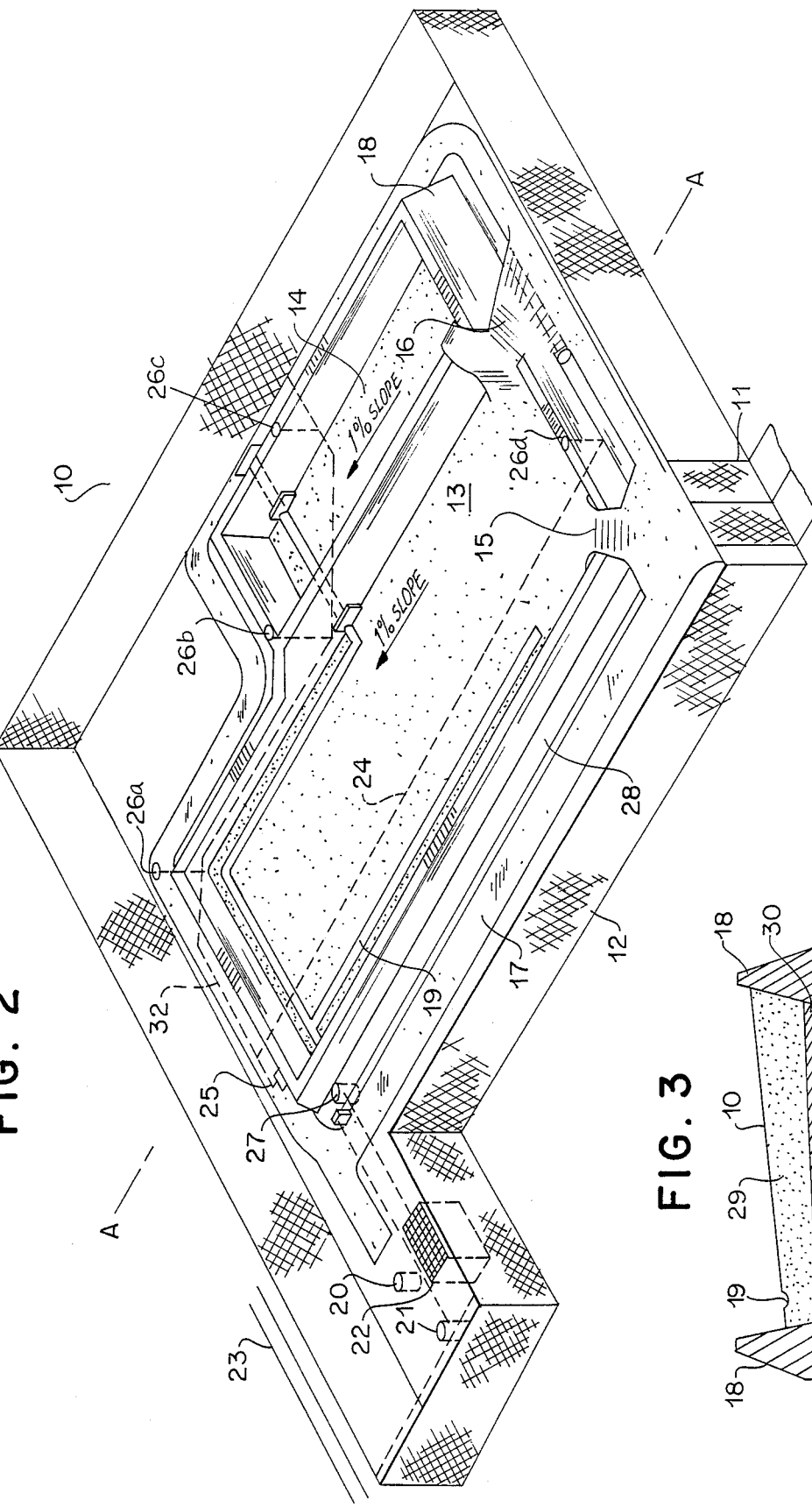
FIG. 2 is an isometric view of the landfarm of the present invention.

Referring to FIGS. 1 and 2, the biodegradable wastes to be treated according to the present invention are brought onto the treatment site 10 by trucks through an entrance 11 in the surrounding fence 12. Access to the treatment bays, 13 and 14 respectively, is obtained via ramps 15 and 16, respectively, from an access road 17 which surrounds the treatment bays 13 and 14. Each of the treatment bays, 13 and 14, is surrounded by a dike 18.

The structural materials, basic construction, height and exterior slope of the walls of the dike 18 follow conventional practice and may be modified to adapt to such variables as local soil conditions, available construction materials, rainfall, area of treatment bays, etc., all to the end that the dike satisfactorily performs its containment function. However, as better described below, and as may be best seen in FIGS. 4 and 5, the interior of the dike 18 forms a part of treatment bays 13 and 14. Dike 18 therefore performs both a treatment function, as well as a structural, containment function.

Still referring to FIGS. 1 and 2, the treatment bays 13 and 14 are graded so that each bay has approximately a one percent (1%) gradient. The latter gradient may vary within a range of from 0.5% to 1.5%. At the bottom of the slope in each of treatment bays 13 and 14 are located drainage ditches 19, also shown in FIG. 5. Ditches 19, which are preferably concrete lined, carry off the surface water which, because of the gradient of the treatment bays 13 and 14, collects at the low point of the treatment bays.

Figure 3:
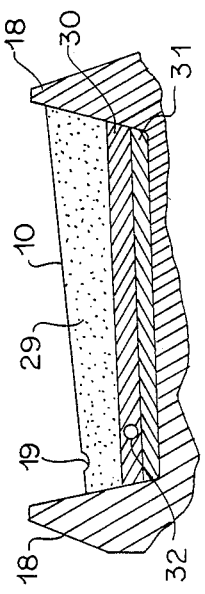
FIG. 3 is a vertical sectional view of the landfarm of the present invention, taken at point A—A of FIG. 1.
Figure 4:
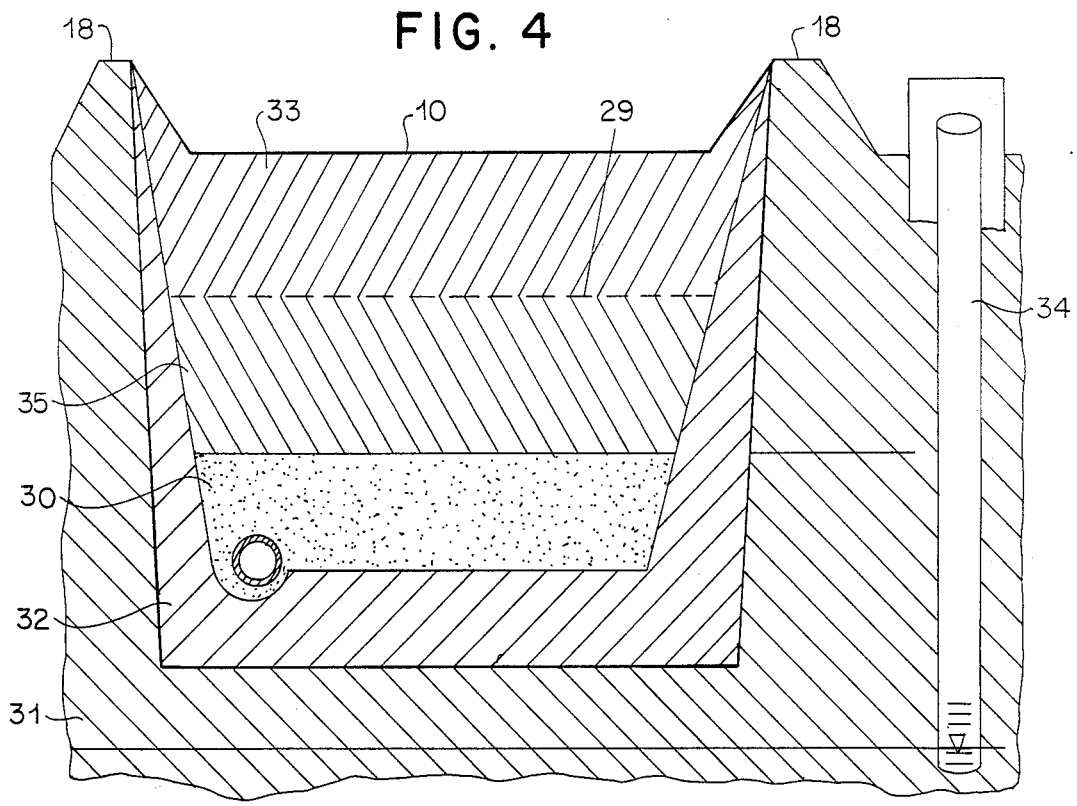
FIG. 4 is another, stylized, view of A—A of FIG. 1, including a monitoring well, and showing an outline of the processes occurring, and where, in the present landfarm.
Figure 5:
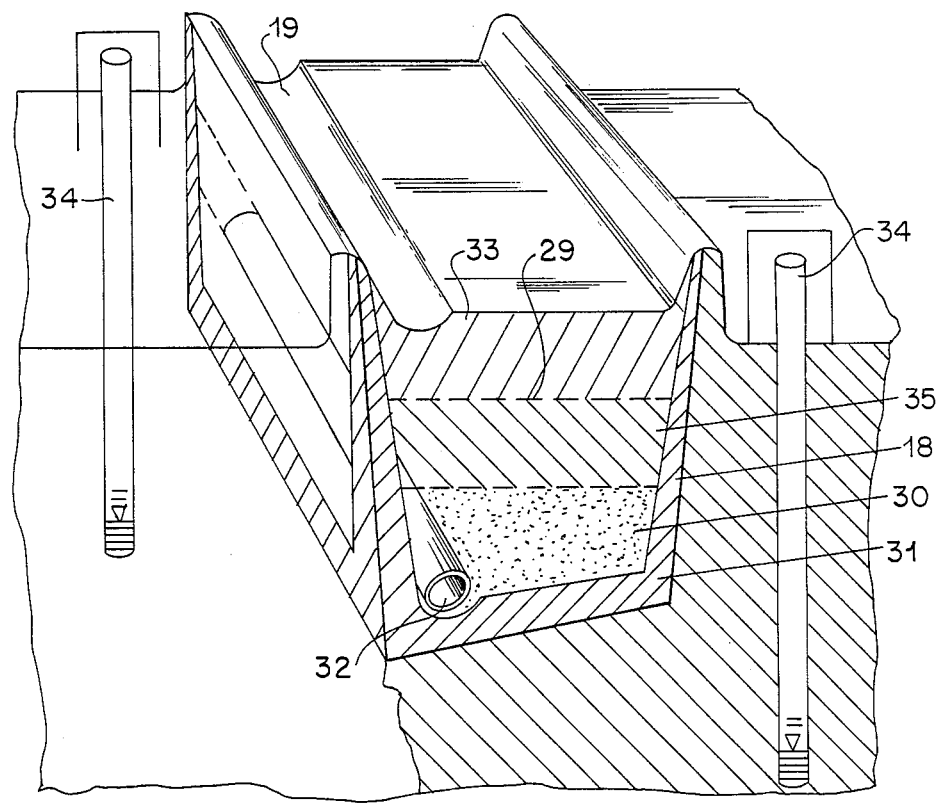
FIG. 5 is an isometric view of a part of the present invention, particularly illustrating the surface and underdrain water removal systems built into the landfarm.

The surface drainage system, of which drainage ditches 19 are a part, is paralleled by a subsurface drainage system, best shown in FIGS. 3, 4, and 5. The latter system consists in part of drainage pipes 32, which, like surface drainage ditches 19, are located at the lower end of the slope of each of treatment bays 13 and 14. Subsurface drainage pipes 32, located in the subsurface permeable sandy zone 30 (See FIG. 4), are fed by subsurface collection pipes 24, also located in sandy zone 30 (See FIG. 2). Leachate percolating through the permeable layer 30 of sandy soils is collected by subsurface pipes 32 and 24 and is withdrawn to a wastewater/effluent treatment system, described below.

Ditches 19 and subsurface drainage pipes 24 and 32 are part of a wastewater and leachate collection and treatment system, which is illustrated in FIGS. 1, 2, and 5. Surface water, which may contain oily and other wastes, is collected by ditches 19. The subsurface leachate is collected by drainage pipes 24 and 32 and passed to a drainage sump 25 (FIG. 1). Both the surface water and leachate are then passed to and processed by a treatment system, located adjacent to treatment bays 13 and 14 and consisting of an oil sump 20, an oil skimmer 21, and a corrugated plate separator 22 (FIG. 1), all of which are conventional. The corrugated plate separator 22 receives the oily surface water from drainage ditches 19 and separates the oil from the water. The oil thus separated is collected in the oil sump 20. The water, less the bulk of the oil, is then passed to the oil skimmer 21, where any remaining oil is removed. The water thus treated is fit for and is passed to a drainage canal 23, located outside of the treatment site 10 (FIG. 1).

Access to the leachate treatment system is provided at cleanout facilities 26a, -b, -c, and -d, shown in FIGS. 1 and 2. Larger scale access is provided at a key intersection in the system by manhole 27 (FIG. 2).

The system of the present invention, described above, and as seen in FIGS. 1 and 2, is complemented by drainage swales 28, which run around the periphery of the dike 18.

FIGS. 1 and 2 describe one aspect of the system of the present invention, namely, the arrangement of drains and apparatus which collect and process surface water and subsurface leachate. In FIGS. 3, 4, and 5 is illustrated another aspect of the present invention, namely, the arrangement of the subsurface soil zones which also play an important role in collecting and treating the water associated with the landfarm and are an integral part of the present invention.

FIG. 3 is a schematic vertical section of the present landfarm taken at line A—A of FIGS. 1 and 2. Dike 18

(for convenience and clarity, the same numbers are used to illustrate the same elements throughout the FIGS.) is shown bounding and containing the landfarm site 10. In FIGS. 3 and 5 the principal soil layers may be seen, the topmost of which is the treatment zone 29. Treatment zone 29 is composed of a combination of soil, clay, loam, and sand, which in combination have been found to provide the optimum conditions for the soil bacteria present in treatment zone 29 to degrade the waste constituents which have been spread over the surface of treatment zone 29. The combination of soils present in treatment zone 29 has a high cation exchange capacity, allowing that layer to immobilize the non-degradable constituents present in the waste that has been applied while permitting the controlled drainage of water into the collection and treatment system described above in connection with FIGS. 1, 2, and 5. Treatment zone 29 also functions to capture the sludge present in the applied wastes.

In a preferred embodiment, the soil components of the treatment zone 29 are present in the following proportions: sand, 60 to 70 percent; clay, 20 to 30 percent; and silt, 10 percent. Preferably, these soils should have a minimum Cation Exchange Capacity (CEC) of about 5 to 15 milliequivalents per kilogram. As is known, the CEC is a measure of the ability of a soil to hold cations, such as most metals. The present invention also contemplates the use of the anion exchange capacity, useful in capturing certain metals, of some soils. Also contemplated is the use of adsorbent materials to hold constituents in place while transformation of potentially harmful components to innocuous inert materials takes place.

Again referring to FIG. 3 (also please see FIGS. 4 and 5), located below treatment zone 29 is a layer of 30 of permeable sand, in which is located the leachate collection system described above in connection with FIGS. 1 and 2 (also FIG. 5).

Beneath the porous sandy layer 30 is an impermeable layer 31 (FIGS. 3, 4, and 5). Layer 31, which typically consists of clay or a membrane liner or liners, assists in protecting the underlying groundwater from whatever minimal amount of migrating pollutants that may be present in the leachate at this level.

FIG. 3 also illustrates an important element of the present invention, that is, the sloping of the landfarm site 10, as well as each of the three soil layers within it, to maximize drainage to, and collection of fluid and contained pollutants by, surface drainage ditches 19 and the internal drainage system, consisting of drainage pipes 24 and 32.

FIG. 4 is another cross-sectional schematic view of the landfarm of the present invention, again taken at line A—A of FIG. 1. In FIG. 4 the interior of the present land farm is shown in more detail than in FIG. 3. FIG. 4 also indicates the processes occurring within the three layers 29, 30, and 31 of the waste treatment site 10, or example, reference to FIG. 4 shows that the upper one-half (approximately 2 to 3 feet) of the treatment zone is the so-called "zone of incorporation" 33, in which the aerobic bacteria present in the soil degrade the oil and grease components of the waste applied to the site surface. During this process, as is indicated by FIG. 4, a minimal amount of volatile hydrocarbons are released to the air.

The present invention contemplates the nearly complete containment of such volatile hydrocarbons by enclosing the treatment bays 13 and 14 within an inflatable cover, the pressure within which is maintained by compressed air.

FIG. 4 also shows that in the bottom one-half 35 of the treatment zone, also approximately 2 to 3 feet in thickness, are captured the non-degradable components, such as metals.

FIG. 4 also shows that permeable sandy zone 30 is slightly more than 1 foot in thickness. Subsurface drainage pipe 32, present in this layer, is shown. FIG. 4 also shows in better detail the relationship of the bottom impervious zone 31 to the zones above it. FIG. 4 shows that the bottom of the impervious zone 31 is about 1 foot above the groundwater table. It, as does FIG. 5, also shows the way in which the impermeable layer 31 extends up the sides of the treatment site 10 to the top of dikes 18 to form an impermeable barrier on all sides as well as the bottom of the site 10. The impermeable zone illustrated in FIG. 4 consists of clay but the present invention contemplates the use of other impermeable barriers such as a liner or liners. FIG. 4 also shows that the zone of incorporation 29 also extends to the top of dikes 18, thereby ensuring that there is no surface area within treatment bays 13 and 14 that is not subject to the degradative processes occurring within them. FIG. 4 (and FIG. 5) also illustrates the use of a monitoring well or wells 34 located just outside the site 10, whereby the passage of contaminants, in the unlikely event of such an occurrence, into the groundwater may be monitored and controlled.

FIG. 5 is an isometric view of that portion of the landfarm illustrated in FIG. 3. FIG. 5 illustrates the relationship between aspects of the surface and subsurface drainage systems, and the location of those systems within the different soil levels. FIG. 5, for example, shows clearly the location of drainage ditch 19 on the surface of the topmost soil layer, treatment zone 29. FIG. 5 also illustrates the location of subsurface drainage pipe 32 within the permeable soil layer 30.

As may be seen from the above description, the present invention provides important advantages, as compared to prior landfarms, in the safe containment and treatment of contaminants. In this respect, it has been found that there is essentially no loss of potentially harmful contaminants from the present landfarm to the environment.

Nearly as important, it has been found that the present invention offers important advantages in efficient and economical operation and in general cost effectiveness. The present invention shares with previous land farms the advantages of limited equipment requirements, namely, a dump truck or vacuum truck to haul the waste to, and spread it on, the site, and a tractor to till the waste after it has been applied. Further, like other landfarms, the present system is not labor intensive, in that the degradation process is passive. The waste is applied and processing thereafter is minimal, consisting merely of occasional tillage, and the periodic application of standard fertilizers and lime (to maintain the appropriate pH).

The present landfarm, however, provides heretofore unrealized advantages in respect to frequency of application, site area, decrease in labor involved with water removal and extended seasonal use. The present invention contemplates the application of wastes, which may be of all degrees of consistency from liquid to semi-solid, as often as once per month, or even more frequently. It has been found that the "half-life" of wastes applied to the landfarm of the present invention, that is, the period required for the applied wastes to be 50 percent degraded, is about 50 days. Ninety-nine percent (99%) of the applied waste is fully degraded within a year. It is estimated that the landfarm site itself will not reach potentially dangerous levels of non-degradable constituents such as metals for more than twenty (20) years.

The present landfarm is able to make use of a smaller site or more efficient use of a site of the same size. In general, as with other known landfarms, the surface area required by the present landfarm is dependent upon weather conditions (e.g. rainfall, evaporation, air temperature, number of days below freezing), soil types within the treatment zone, and the nature of the waste applied. The present landfarm helps to compensate for environmental conditions which have limited the effectiveness and utilization of previously existing landfarms, because, as described above, incident rainfall is conveyed across the sloped landfarm surface to lined surface drainways at the bottom of the slope. Standing water is thereby removed, as is the need for labor to remove it, and the time during which the bacterial populations are active and able to degrade waste (up to 25 percent more available time) is thereby maximized. Secondly, the soil matrix maximizes the growth of such bacteria. Thirdly, because of the subsurface drainage system, the treatment zone does not become saturated with water and the bacteria are not deactivated. For all of these reasons, it has been found that the system of the present invention increases treatment capacity up to 35 to 40 percent over previously known systems for the same surface area.

The greater efficiency and safety of the present invention allows wastes to be applied more frequently and over a greater portion of the year. Further, the landfarm of the present invention can be used at more locations than existing systems because it may be used in regions of permeable soils, and its greater efficiency permits its use where space is limited.

In the long run, because environmental protection is maximized, waste application capability is increased, and there are minimum maintenance requirements, the cost effectiveness of the present system is greater than that of previously known landfarms. Nevertheless, although the present invention is more versatile, effective, and environmentally protective than previously known systems, the treatment of the wastes required by the present system—initial spreading, routine harrowing or discing, fertilization, and liming—is not more than that required by previously known systems.

Additionally, the construction and design of the landfarm of the present invention make it possible to add additional landfarm area and connect it to the existing treatment system. Cost duplication is therefore minimized.

While the present invention has been described as above and in conjunction with preferred specific embodiments thereof, it will be understood that this description is intended to illustrate and not limit the scope of the invention, which is defined by the following claims.

Accordingly,

What we claim is:

1. A landfarm installation especially adapted for use in areas with highly permeable soils, high water tables, or having critical groundwater supplies, for the placement and treatment of biodegradable waste containing hazardous elements, comprising:

a. at least one treatment bay, having a gradient of about 1%, and a surface which receives said waste;
 b. a dike surrounding the treatment bay;
 c. a topmost soil layer of the treatment bay, said topmost soil layer having a gradient and being composed of sand, clay, and silt, in the approximate proportions of 6:3:1, respectively
 d. a permeable sandy soil layer, with a gradient, underlying said topmost zone;
 e. an impermeable layer, with a gradient, underlying said permeable sandy zone;
 f. a surface drainage system for collecting and removing surface liquid at the lower end of the gradient of the surface of said treatment bay;
 g. a subsurface drainage system for removing leachate in said permeable sandy zone;
 h. treatment apparatus for receiving the drainage outflow from said surface and subsurface drainage system and for separating the water from components thereof; and
 i. an external drainage system for receiving and conveying the treated, unpolluted, effluent from said treatment apparatus.

2. An installation according to claim 1 in which there are a plurality of treatment bays.

3. An installation according to claim 1 in which the gradients of the surface of the treatment bay and of the topmost soil layer, the permeable sandy soil layer and the impermeable layer are each within the range of from 0.5 to 1.5%.

4. An installation according to claim 3 in which the gradients of said surface and of said layers are identical.

5. An installation according to claim 1 in which the proportions of the elements of the topmost soil layer are as follows: sand, 60 to 70%; clay, 20 to 30%; and silt, 10%.

6. An installation according to claim 1 in which the topmost soil layer has a minimum Cation Exchange Capacity of from 5 to 15 milliequivalents per kilogram.

7. An installation according to claim 1 in which the topmost soil layer has a high anion exchange capacity.

8. An installation according to claim 1 in which the topmost soil layer contains adsorbent materials which assist the retention of said elements while said elements are converted to innocuous, inert, materials.

9. An installation according to claim 1 in which the treatment apparatus comprises an oil skimmer, oil sump, and a corrugated plate separator.

10. An installation according to claim 1 in which the impermeable layer consists of a clay.

11. An installation according to claim 1 in which the impermeable layer consists of a membrane liner.

12. An installation according to claim 1 in which the impermeable layer consists of a plurality of membrane liners.

13. An installation according to claim 1 in which the topmost soil layer and the impermeable layer extend to the top of the inside of the dike.

14. An installation according to claim 1 in which the impermeable layer extends to the top of the dike.

15. An installation according to claim 1 in which the surface drainage system comprises concrete lined drains.

16. An installation according to claim 1 which includes means for access to the treatment bay.

17. An installation according to claim 1 in which the gradient of the treatment bay is from 0.5% to 1.5%.

18. An installation according to claim 1 which includes means for detecting and measuring contaminants in the groundwater.

19. Process for the treatment of biodegradable waste which contains hazardous elements, said process being especially adapted for use in areas with highly permeable soils, high water tables, or having critical groundwater supplies, comprising:
  a. forming at least one treatment bay, said treatment bay having a gradient of about 1%, and a surface for the receipt of said waste;
  b. constructing a dike around said treatment bay;
  c. forming a topmost soil layer within said treatment bay, said topmost soil layer having a gradient and being composed of sand, clay, and silt, in the approximate proportions of 6:3:1, respectively.
  d. forming underneath said topmost soil layer a permeable sandy soil layer with a gradient;
  e. forming underneath said permeable sandy soil layer an impermeable layer with a gradient;
  f. providing a surface drainage system at the lower end of the gradient of the surface layer of said treatment bay;
  g. providing a subsurface drainage system for removing leachate in said permeable layer of sandy soil;
  h. providing in the vicinity of said treatment bay treatment apparatus for receiving and treating the drainage outflow from said surface and said subsurface drainage systems;
  i. providing a drainage system for receiving and conveying away from the treatment site the effluent from said treatment apparatus;
  j. providing access means to said treatment bay for delivery of biodegradable waste;
  k. periodically spreading said waste over the surface of said treatment bay;
  l. subjecting said waste to periodic tillage; and
  m. periodically adding such amounts of fertilizer and lime to said wastes as may be required in order to maintain in said waste an appropriate pH.

20. A process according to claim 19 whereby a plurality of treatment bays are formed.

21. A process according to claim 19 whereby the surface of the treatment bay, the topmost soil layer, the permeable sandy soil layer, and the impermeable layer are each formed with a gradient of from 0.5 to 1.5 percent.

22. A process according to claim 19 whereby the gradients of said surface and said layers are formed with identical gradients.

23. A process according to claim 19 whereby the surface of the treatment bay, the topmost soil layer, the permeable sandy soil layer, and the impermeable layer are each formed with a gradient of about 1 percent.

24. A process according to claim 19 whereby the topmost soil layer is formed with a Cation Exchange Capacity of from 5 to 15 milliequivalents per kilogram.

25. A process according to claim 19 which employs a treatment apparatus consisting of an oil skimmer, an oil sump and a corrugated plate separator.

26. A process according to claim 19 whereby the impermeable layer is formed from a clay.

27. A process according to claim 19 whereby the impermeable layer is formed from a membrane liner.

28. A process according to claim 19 whereby the impermeable layer is formed from a plurality of membrane liners.

29. A process according to claim 19 whereby said topmost soil layer and said impermeable layer are extended to the top of the inside of the dike.

30. A process according to claim 19 whereby said impermeable layer is extended to the top of the dike.

31. A process according to claim 19 whereby the surface drainage system is formed from concrete-lined drains.

32. A process according to claim 19 whereby the topmost soil layer is formed with a high anion exchange capacity.

33. A process according to claim 19 whereby adsorbent materials are added to the topmost soil layer in order to assist the retention of said elements while said elements are converted to innocuous, inert, materials.

34. A process according to claim 19 in which the treatment bay is formed with a gradient of 0.5 to 1.5%.

35. A process according to claim 19 whereby means for detecting and measuring contaminants in the groundwater is provided.

* * * * *